March 24, 1970     H. J. HILL ET AL     3,502,147
CHEMICAL FLOODING TECHNIQUE TO RECOVER OIL
Filed June 12, 1968     9 Sheets-Sheet 1

INVENTORS:
HAROLD J. HILL
CHARLES STEWART SARGENT, JR.
BY:
THEIR AGENT

United States Patent Office 3,502,147
Patented Mar. 24, 1970

3,502,147
CHEMICAL FLOODING TECHNIQUE TO RECOVER OIL
Harold J. Hill, Houston, Tex., and Charles Stewart Sargent, Jr., Slidell, La., assignors to Shell Oil Company, New York, N.Y., a corporation of Delaware
Filed June 12, 1968, Ser. No. 736,402
Int. Cl. E21b *43/16, 43/22*
U.S. Cl. 166—274                 11 Claims

ABSTRACT OF THE DISCLOSURE

An improved method for oil recovery from an underground oil-bearing formation using a driving fluid by pretreating the oil-bearing formation zone prior to injecting a driving fluid therein with a slug of conditioning fluid comprising an aqueous solution containing surfactant micelles in combination with molecules of an amphiphilic organic compound of low water solubility and a water-soluble polyphosphate.

BACKGROUND OF THE INVENTION

This invention relates to the displacement of oil from the pores of subterranean, oil-containing reservoirs, and more particularly to special surface-active systems to be used with fluid drive techniques, e.g., "water-flooding" techniques to improve the oil displacement efficiency of waterfloods.

Knowledge is widespread in the oil industry that the so-called "'primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary and tertiary recovery" techniques which have as their primary purpose the economical recovery of additional quantities of the residual oil known to be present in the reservoir.

Probably, one of the more common secondary recovery techniques is the so-called "waterflooding" in which aqueous fluids are injected at one point in the reservoir at pressures sufficient to be forced out into the reservoir and toward a spaced production well or wells, there, in effect, displacing oil from the pores of the reservoir and driving the oil ahead of the water front.

However, such techniques, e.g., waterflooding is only advantageous when the cost of injecting water and necessary chemical modifiers is less than the value of the oil recovered. Therefore, the displacement efficiency of waterfloods or the like has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only about 10 dynes per centimeter the increase in the amount of oil that can be recovered is not generally significant. Thus, the cost of obtaining the reduction in the interfacial tension is apt to be more than the value of the increased amount of oil that is recovered in many cases.

Many aqueous systems containing surfactants have been used to aid in oil recovery and among the most promising of such systems are described in U.S. Patents 3,330,344 and 3,348,611 in which improved and effective oil recovery is achieved by treating the formation with an aqueous liquid containing an oil-solubilizing aqueous solution of surfactant micelles that are combined with molecules of an amphiphilic organic compound of low water solubility. In such systems the concentration of the surfactant in the aqueous solution should exceed the critical concentration for micelle formation and the amphiphilic material should be capable of swelling the surfactant micelles and causing the aqueous solution to solubilize a significant proportion of oil. In using such systems oil is recovered by injecting an aqueous liquid to drive the surfactant system and the oil toward a production well.

Although the above aqueous systems function effectively in aiding in oil recovery relatively large amounts of the additive mixture are required to effect substantial increase in oil recovery; large losses, which are not recoverable, of these additives are encountered because of their high adsorptive tendencies for the rock formation and, in some reservoirs, their effectiveness is reduced because of plugging due to precipitation when such systems come in contact with polyvalent metal ions. The polyvalent metal ions may be present in the injection water used to form the aqueous systems containing the surfactant micelles and molecule of amphiphilic organic compounds as described in the above-mentioned patents or connate water containing polyvalent metal ions present in the underground production zones of formations from which oil is to be recovered. Under such conditions, precipitation of the surfactant tends to plug the formation and require the use of high injection pressures. If the injection pressure becomes too high the reservoir is apt to be damaged.

SUMMARY OF THE INVENTION

It has now been discovered that oil recovery can be greatly improved and increased by injecting into the oil producing zone of an oil-containing formation, prior to injecting a drive fluid, a slug of an aqueous solution of surfactant micelles that are combined with molecules of an amphiphilic organic compound of low water solubility and a polyphosphate, said aqueous solution may also contain an electrolyte such as sodium chloride. By addition of a polyphosphate such as a water-soluble alkali metal polyphosphate to aqueous solutions containing surfactant micelles combined with molecules of an amphiphilic organic compound, a synergistic effect is achieved including (1) reduction in amount of surfactant required (2) prevention of precipitation of the surfactants and plugging of the formation, (3) reduction in the pressure required to drive fluid through the formation, (4) adsorption of the additives on the rock surfaces is reduced aiding in the subsequent recovery of the surfactant, if desired, (5) mobility of the aqueous system is improved and (6) the polyphosphates increase the multivalent cation tolerance of the surfactant-amphiphilic system and improves the emulsion forming properties of such systems when in contact with the oil in the oil producing zone of the formation. Earth formations thus treated should be suitably provided with injection and production wells and the driving fluid systems may be substantially any aqueous liquid that is compatible with the aqueous solution containing the surfactant system.

In accordance with the process of this invention the aqueous solutions are formed by mixing and blending together (1) substantially any aqueous liquid comprising water or a water solution of one or more inorganic solutes that remain soluble when the solution is contacted by the components of the reservoir formation, (2) substantially any surface active material, preferably anionic, having the properties that normally characterize a surfactant, (3) an amphiphilic material comprising a polar organic material having a low water solubility and (4) a polyphosphate.

Suitable aqueous liquids (1) include: water; water solutions of alkali metal chlorides, carbonates, e.g., water solutions of salts such as sodium carbonate, sodium chloride, sodium bicarbonate, etc.; and mixtures thereof. The pH of the aqueous liquid is preferably adjusted to one that is compatible with both an active form of the surfactant and the materials that will be encountered during the passage of the liquid through the reservoir formation.

Suitable surfactants (2) include: the anionic, nonionic and cationic surface active materials, e.g., soaps of fatty acids, such as oleic, linoleic, hydroxy steric, etc.; soaps of mixed organic acids, such as the tall oil fatty acids, tall oil pitch, rosin acids, the petroleum naphthenic acids, the soybean oil fatty acids, etc.; organic sulfonates and sulfonic acid salts, and the like, e.g., surface-active materials such as those described under the classification of detergent compounds in Industrial Detergency by William W. Niven, Jr., Reinhold Publishing Company, New York, 1955. In forming the present solubilizing solutions, the selection of the concentration at which the surfactant is disoslved in the aqueous liquid is preferably based on the CMC proportions for such a system at the temperature of the reservoir formation. The surfactant concentration is preferably at least equal to the CMC proportions and may exceed them to the extent that is economically advantageous. In general, increasing the proportion of surfactant increases the oil solubilizing capacity, the viscosity and the cost of the solubilizing solution.

Suitable amphiphilic coupling agents (3) include: the higher molecular weight, monohydroxy aliphatic and alicyclic alcohols, such as those containing six or more carbon atoms; the aromatic hydroxylic compounds such as the phenols, cresols, etc.; the pine oils; the sterols; cholesterols; bile salts; fatty acids containing six or more carbon atoms; sulfonic acid or sulfonate salts of low water solubility; amines or esters of low water solubility; etc.

In forming the present solubilizing solutions, the selection of the concentration at which the amphiphile is dissolved in the surfactant micelles is preferably based on the amount required to saturate the solution, or combination, capabilities of the surfactant micelles at the temperature of the reservoir formation. This can be determined by maintaining a portion of the aqueous liquid solution of the surfactant micelles at the temperature of the reservoir formation and adding portions of the amphiphile until the addition of an additional portion causes the solution to remain turbid. The amphiphile concentration is preferably one lying betwen the proportion of the amphiphile that is required to saturate the aqueous liquid and the proportion that is required to saturate the micelles.

In preparing the aqueous solutions the mixture of surfactant and amphiphilic material is preferably first dispersed in fresh water at a concentration about twice that selected for use. The fresh water stock is then blended with an aqueous solution containing about twice the concentration of polyphosphates, and for low other electrolyte, that is selected for use in the oil recovery operation.

Suitable polyphosphate (4) include: water-soluble polyphosphates salt such as the alkali metal polyphosphate, e.g., Na, K or Li tripolyphosphate or hexametapolyphosphate or mixtures of such polyphosphates.

The most effective aqueous systems, and those which are preferred, are aqueous electrolytic solutions containing polyphosphates and mixtures of high molecular weight alkyl aryl sulfonates which are generally water insoluble and lower molecular weight alkyl aryl sulfonates which are generally water soluble which result in a stable, aqueous dispersed system of the sulfonates which greatly enhances the ability of the system to displace oil from reservoirs.

More specifically, the present invention involves the use of water-flooding operations which provide an aqueous system comprising an aqueous liquid having dispersed therein a polyphosphate salt and a mixture of alkyl aryl sulfonates in which at least one surface active alkyl aryl sulfonate that is water soluble and is present in an amount exceeding its critical micelle concentration in the aqueous liquid is mixed with at least one surface active alkyl aryl sulfonate that is relatively water insoluble. Such an aqueous liquid dispersion can be formed by mixing an aqueous liquid with (a) both a water soluble surface active organic sulfonate and a relatively water insoluble surface active organic sulfonate, or alternatively (b) natural petroleum sulfonates that contain both water soluble and relatively water insoluble organic sulfonates in the necessary proportions. The procedure (b) is particularly preferred since it comprises mixing the aqueous liquid with a low cost commercially available mixture of sulfonates such as mahogany sulfonates. A water soluble surface active alkyl aryl sulfonate is a monosulfonate which, in the form of its sodium salt, has a molecular weight of from about 300 to 400 or it may be a polysulfonate. A relatively water insoluble surface active alkyl aryl sulfonate is one which, in the form of its sodium salt, has a molecular weight of more than about 450. In the present process the particularly suitable sulfonates are the mahogany sulfonates which are mixtures having average molecular weights of from about 400 to 500. Such mahogany sulfonates contain both water soluble and relatively water insoluble alkyl aryl sulfonates.

In an especially preferred embodiment of this invention, an electrolyte is added to the aqueous liquid that contains the dispersion of the polyphosphates organic sulfonate mixtures and the electrolyte concentration is adjusted to a concentration which causes the interfacial tension between the aqueous dispersion and the oil to be significantly less than 1 dyne per centimeter, and preferably less than about 0.01 dyne per centimeter at the temperature at which the oil is to be displaced by the aqueous dispersion (reservoir temperature). Such a low interfacial tension results from a combination of (a) a low molecular weight, water-soluble sulfonate (association colloid) at a concentration exceeding its CMC; (b) a high molecular weight polar (amphiphilic) sulfonate; (c) an electrolyte concentration that is substantially optimum for the temperature and the composition of the sulfonate and water composition of the system and (d) a polyphosphate. The concentration at which a given electrolyte should be employed in a given aqueous dispersion of the present invention is generally between about 0.1 to 0.7 molar and the polyphosphate should be used in concentrations of from about 0.02% to about 5% and preferably between 0.05% and 2% by weight or even more preferable between 0.1% and 1% by weight.

PREFERRED EMBODIMENT OF THE INVENTION

Figure 1:
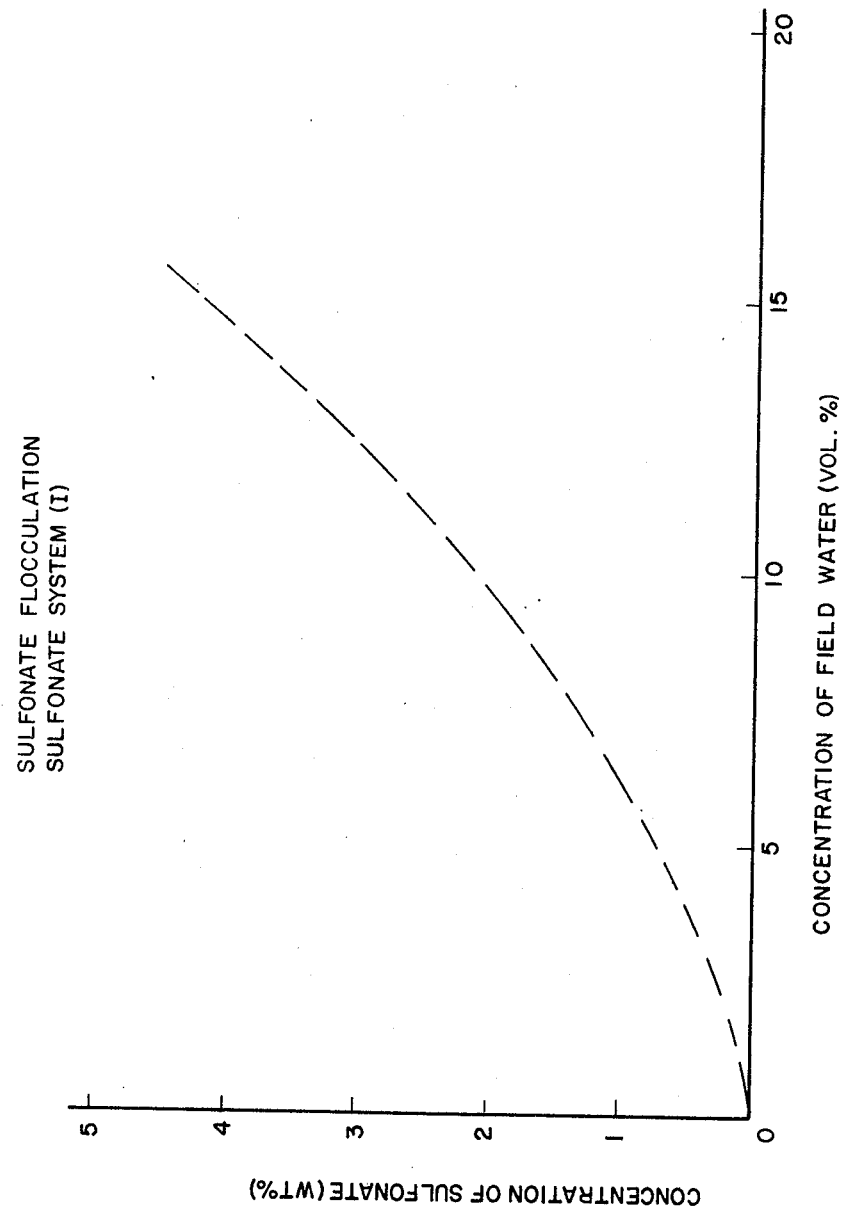
FIGURE 1 is a sulfonate flocculation curve showing the tolerance level of sulfonate for field water.

In essence the present invention is based on the discovery that, in respect to the specified surfactant systems, a polyphosphate reduces the adsorption of surfactant on the rocks, in addition to importing numerous other beneficial properties to the system. In anionic surfactant systems it has been found that the anionic surfactant salts tend to precipitate and impede the flow of fluid when they come into contact with water-soluble salts of polyvalent metals.

Various sequestering agents have been found to be capable of reducing in some degree such plugging tendencies by isolating such polyvalent metal ions in the form of water-soluble chelate compounds. However, where the surfactant is an anionic agent such as sulfonate and sulfonate mixtures, a polyphosphate also causes a significant decrease in the adsorption of surfactant, reduces pressure in the system and improves emulsifiability and mobility of the aqueous solution containing the additive mixture of this invention. Also these beneficial effects of the polyphosphate are not inhibited by the presence of viscosity-increasing materials such as "Pusher" or thickeners as described in U.S. Patents 3,341,319; 3,332,904; 3,254,719; 3,367,418; 3,368,620 and 3,370,649 which can be used as an aqueous slug preceding or following the injecting of aqueous solution of this invention.

Example I

The system used to pre-condition an oil producing well comprised an electrolytic (NaCl) water solution containing a blend of 30% wt. of Na petroleum sulfonate (M.W.=380) and a 70% wt. of oil-soluble Na petroleum sulfonate (M.W.=470) and is referred in the figures as Sulfonate Systems (I). Active sulfonate concentrate contained 62.5% wt. sulfonate and the balance oil. At 95° F., the specified blend of plant product at concentrations of 0.5 to 5.0 weight percent forms effective oil recovery systems in sodium chloride concentration range of 1.0 to 2.0 weight percent sodium chloride.

The sources of water used were field produced water and surface water. The produced water contained about 7 weight percent sodium chloride and about 0.6 weight percent (6000 p.p.m.) multivalent ion ($Ca^{++}$, $Ba^{++}$, $Fe^{++}$, $Sr^{++}$, and $Mg^{++}$). The surface water had a total dissolved solids of only 0.02 weight percent with multivalent cation concentration accounting for about 0.003 weight percent (30 p.p.m.). Emulsion tests carried out with sulfonate dispersed in mixtures of the two waters showed that the best mixture for interfacial activity lies in the range of 7.5 to 12.5 volume percent produced water for sulfonate concentrations of 0.5 to 3.0 wt. percent and flow tests indicated that these systems were capable of effective recovery of oil. Excessive pressures were however noted when the aqueous phase displaced by the sulfonate system was produced water. These observed pressures are probably caused by (1) increase in viscosity of the sulfonate system as it mixes with the field water and, as further mixing occurs, (2) plugging of the core by flocculated sulfonate.

Table No. 1 presents data from screening tests carried out to evaluate a number of possible techniques to increase the tolerance of the sulfonate system for the multivalent cations in produced water.

TABLE 1.—FLOCCULATION OF SULFONATE FROM SURFACE WATER WITH FIELD WATER

| 380 mol wt. sulfonate, wt. percent | 470 mol. wt. sulfonate, wt. percent | $NH_4SO_3R$,[1] wt. percent | Additive | Additive Conc., wt. percent | $SO_3R$ Precipitation at vol. percent produced water |
|---|---|---|---|---|---|
| 0.9 | 2.1 | 0.0 | None | | [2] 35 |
| 0.9 | 2.1 | 0.0 | ____do____ | | 11.5 |
| 1.5 | 1.5 | 0.0 | ____do____ | | 12.5 |
| 0.9 | 2.1 | 1.0 | ____do____ | | [3] 11.5–17 |
| 0.9 | 2.1 | 0.0 | Heptane | 1.0 | 12.5 |
| 0.9 | 2.1 | 0.0 | $Na\ HCO_3$ | 0.5 | 12.0 |
| 0.9 | 2.1 | 0.0 | $Na\ HCO_3$ | 1.0 | 15.0 |
| 0.9 | 2.1 | 0.0 | $NaHCO_3/Na_2CO_3$[4] | 0.15 | 12.5 |
| 0.9 | 2.1 | 0.0 | $NaHCO_3/Na_2CO_3$[4] | 0.6 | [5] 14–21 |
| 0.9 | 2.1 | 0.0 | HMP[6] | 0.5 | 20 |
| 0.9 | 2.1 | 0.0 | STPP[7] | 0.5 | 25 |

[1] $NH_3$ neutralized green acids.
[2] Distilled water solution of NaCl at concentration equal to Benton field water.
[3] Foam collapse at 11.5%; flocculates at 17%.
[4] Mole ratio=0.5.
[5] Foam collapse at 14%; flocculation at 21%.
[6] Sodium hexametaphosphate.
[7] Sodium tripolyphosphate.

Figure 2:
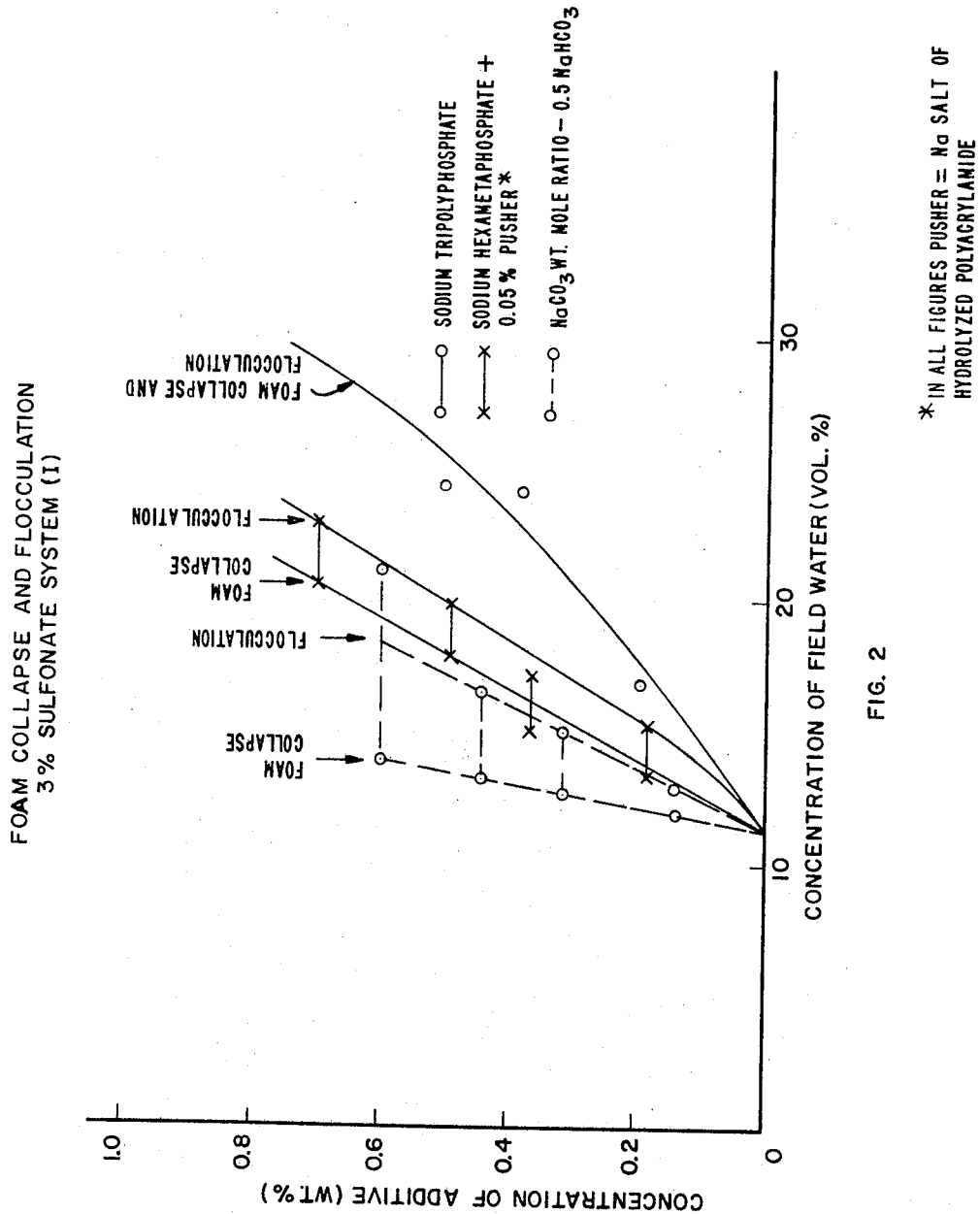
FIGURE 2 shows foam collapse and flocculation curves for a 3 percent sulfonate system with sodium tripolyphosphate, sodium hexametaphosphate and "Pusher," and sodium carbonate, respectively.
Figure 3:
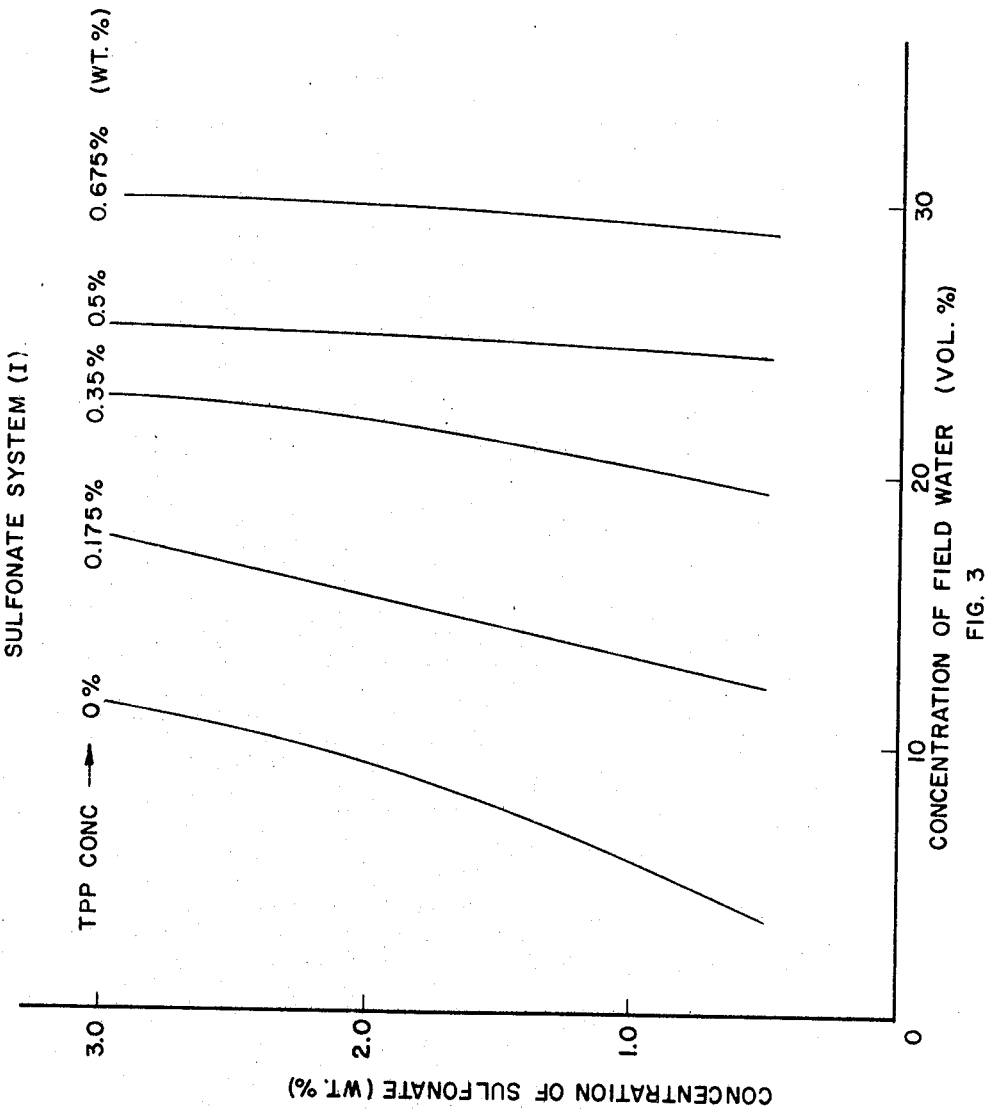
FIGURE 3 illustrates the effect of sodium tripolyphosphate on sulfonate flocculation in a sulfonate system.

These data show that inorganic sequestering and precipitating agents are more effective than certain organic agents screened. The more alkaline blend of sodium carbonate with sodium bicarbonate is more effective than sodium bicarbonate alone. FIGURE 1 shows that the tolerance level of sulfonate for field water decreases as sulfonate concentration decreases. FIGURE 2 shows, for a 3 percent sulfonate system, that the two phosphate sequestering agents are more effective in increasing tolerance for water than the carbonate precipitating agent. FIGURE 3 shows the beneficial effect of various concentrations of sodium tripolyphosphate at sulfonate concentrations between 0.5 and 3.0 wt. percent sulfonate.

Figure 4:
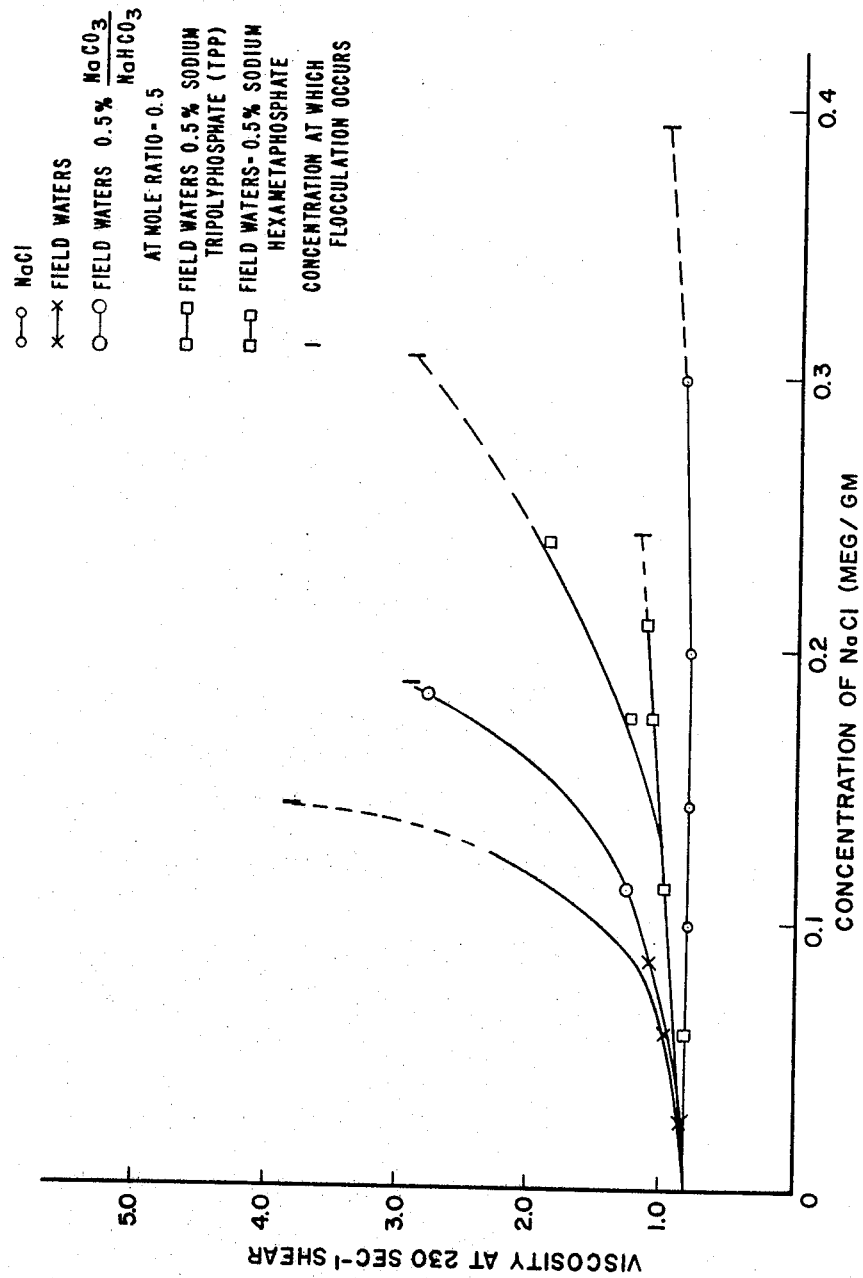
FIGURE 4 shows viscosity curves of a 3 percent sulfonate system with and without inorganic treating agents.

Viscosity of 3 percent sulfonate systems treated with the three inorganic treating agents is compared with the viscosity of untreated systems in field waters and with the viscosity of distilled water-NaCl-sulfonate systems in FIGURE 4. The significant reduction in viscosity and increased salt concentration at which flocculation occurs in treated systems are dramatically illustrated by these data.

Figure 5:
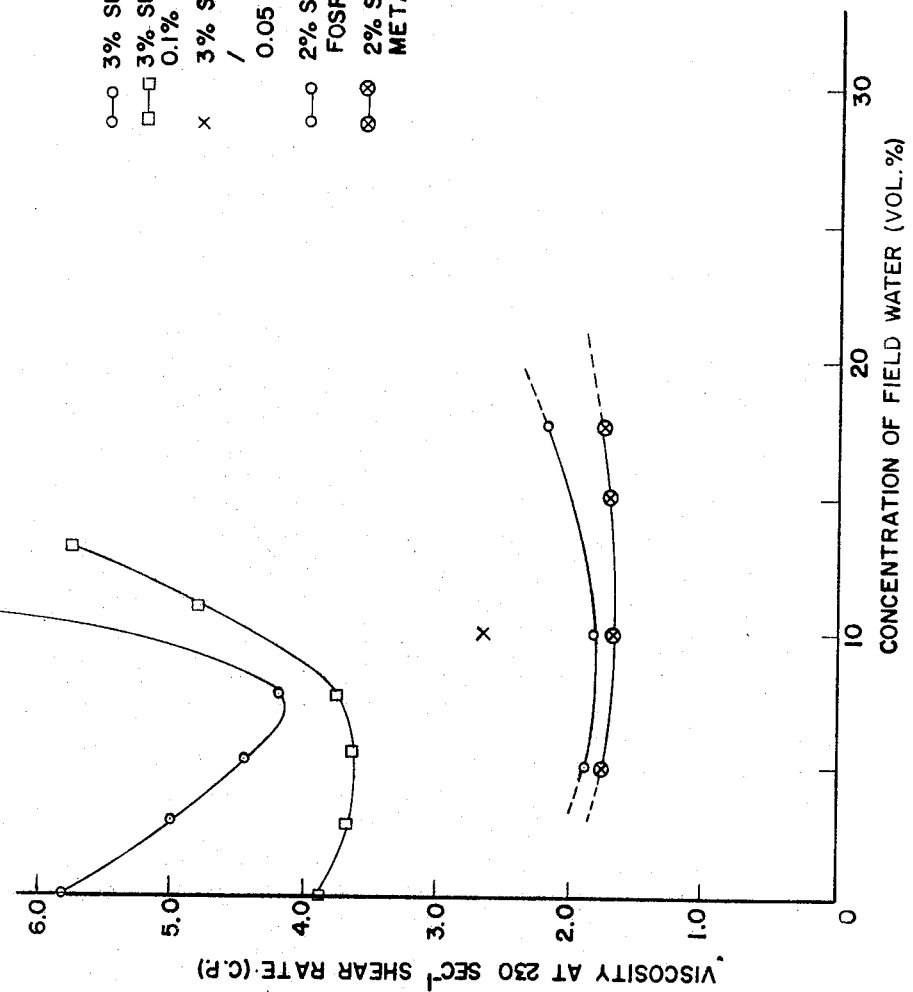
FIGURE 5 shows viscosity curves of a sulfonate system using the polymer "Pusher 520" with and without inorganic treating agents.

Screening tests were also conducted on a number of systems containing Dow Chemical Company's Na salt of hydrolized polyacrylamide "Pusher 520." These tests indicated that the effectiveness of the three inorganic agents was not impaired by the presence of the polymer "Pusher" as shown in FIGURE 5.

Table 2 shows the results of emulsion tests carried out with the three inorganic additives. The polyphosphate treated systems form emulsions of oil having significantly decreased droplet size.

TABLE 2.—SUMMARY OF OBSERVATIONS FROM EMULSION TESTS AT 95° F

| Additive | Additive concentration, wt. percent | Optimum conc. field water (vol. percent) | Color of emulsions in optimum range |
|---|---|---|---|
| None | | 7.5–12.5 | Black to brown. |
| Na$_2$CO$_3$/NaHCO$_3$ Mole ratio=0.5 | 0.5 | 7.5–12.5 | Brown. |
| Sodium hexametaphosphate | 0.5 | 7.5–10 | Light tan. |
| Sodium tripolyphosphate | 0.5 | 10–15 | Do. |

Example II

Figure 6:
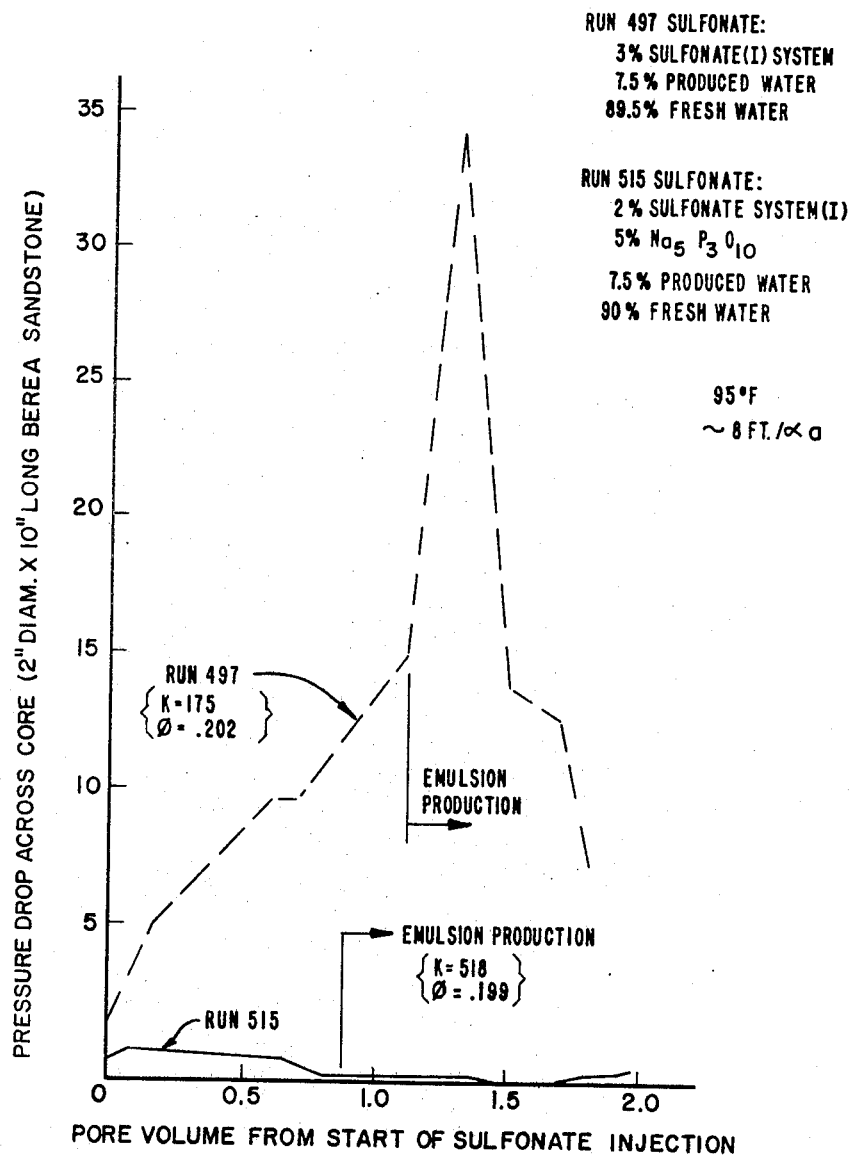
FIGURE 6 is a comparison of the pressure behavior of sulfonate-produced water systems with and without the Na tripolyphosphate additive.

Flow experiments have shown that the addition of Na tripolyphosphate to the aqueous sulfonate relieves the incompatibility between sulfonates and produced water. FIGURE 6 is a comparison of the pressure behavior of sulfonate-produced water systems with and without the Na tripolyphosphate additive. The injection fluids of the two experiments are listed on FIGURE 6. The physical appearance of the produced emulsions and the shape of the pressure curves indicate that the mobility of the produced emulsion was increased considerably by the addition of the tripolyphosphate. Other experiments used to illustrate the effects of the tripolyphosphate on the oil recovery system are summarized in FIGURES 7 and 8. In these tests the multivalent ion content of the connate water at the start of sulfonate injection was insignificant. The field fresh water used as make-up water in the phosphate-containing experiment contains less than 100 p.p.m. multivalent ion. Thus, with the exception of the .5 percent sodium tripolyphosphate in the sulfonate system of run 520, the two experiments were equivalent (.9 percent NaCl in fresh water≈.155 N NaCl).

Figure 7:
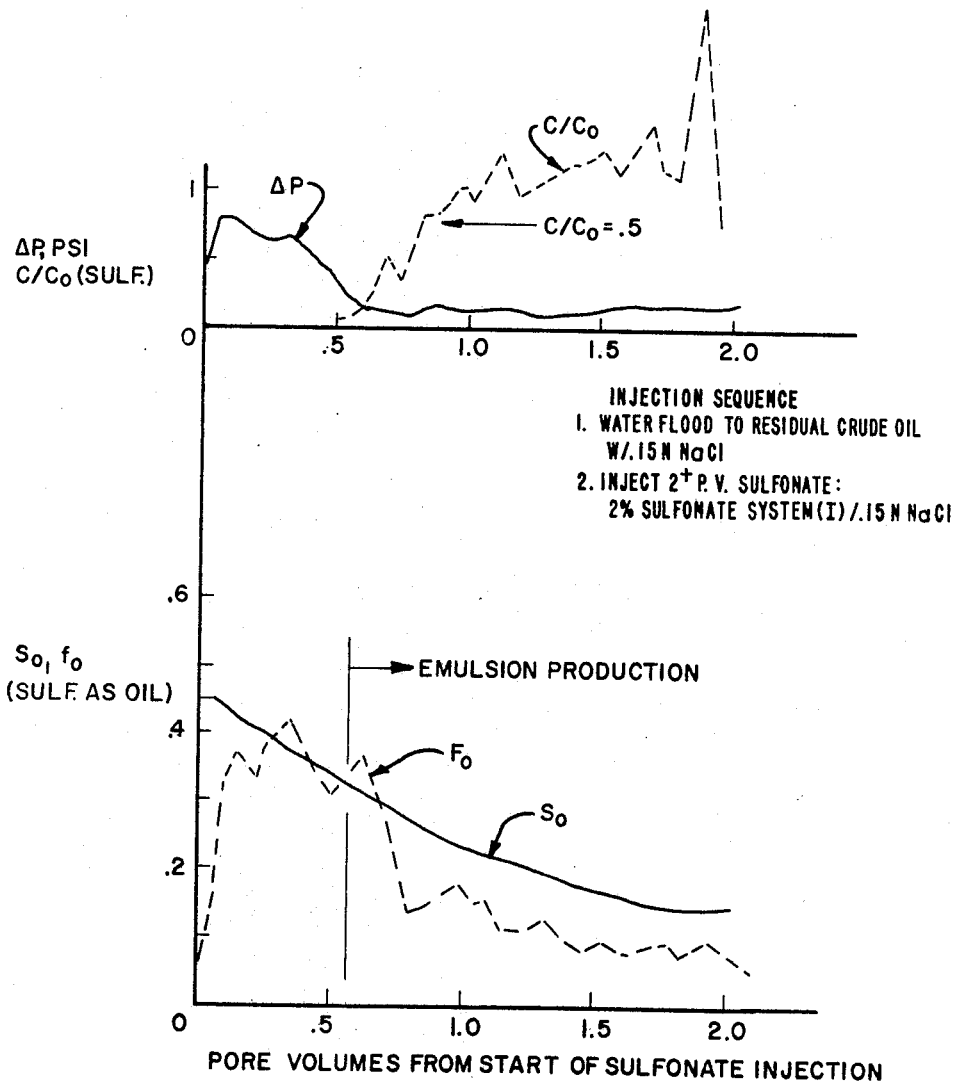
FIGURES 7 to 9 illustrate the effects of inorganic treating agents in an aqueous sulfonate system on oil recovery.
Figure 8:
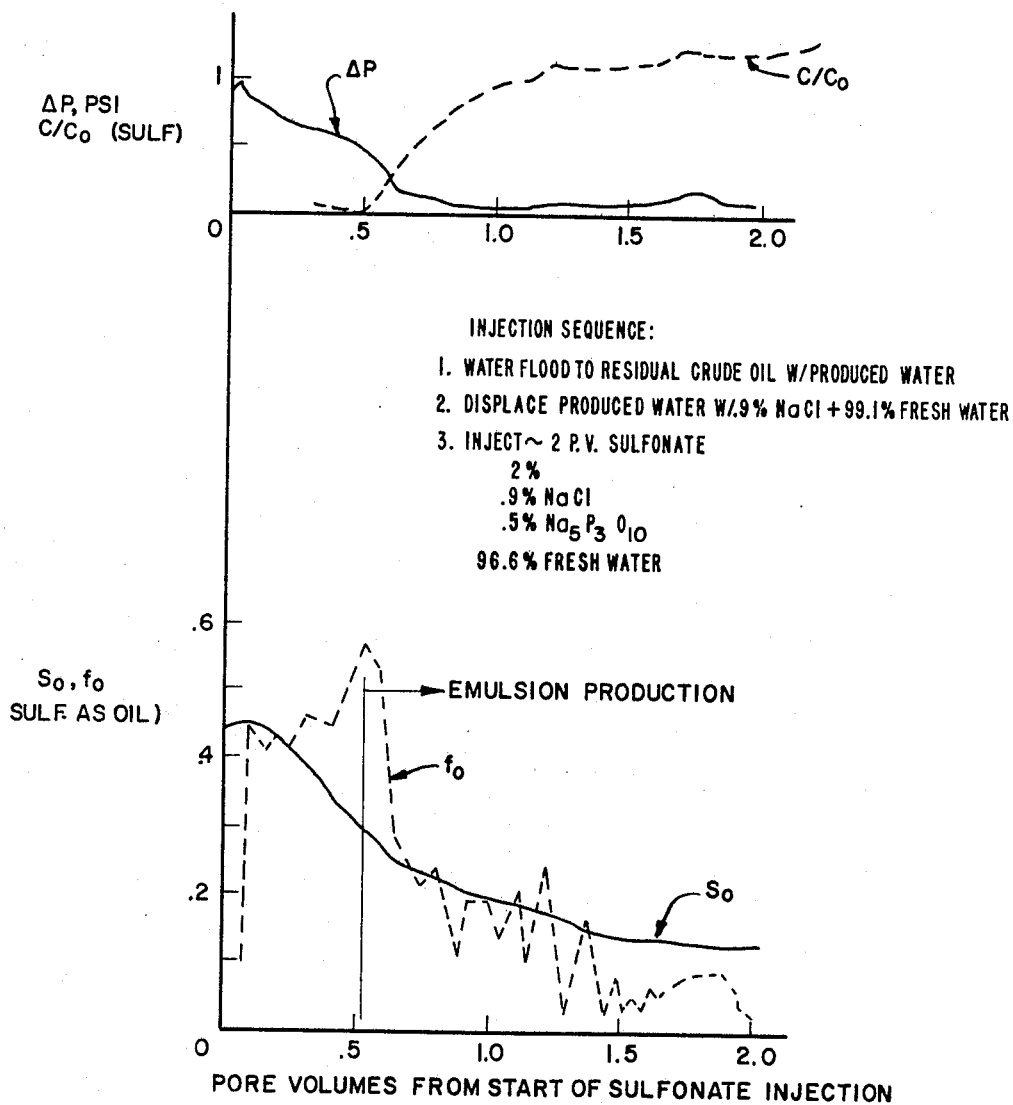
Figure 9:
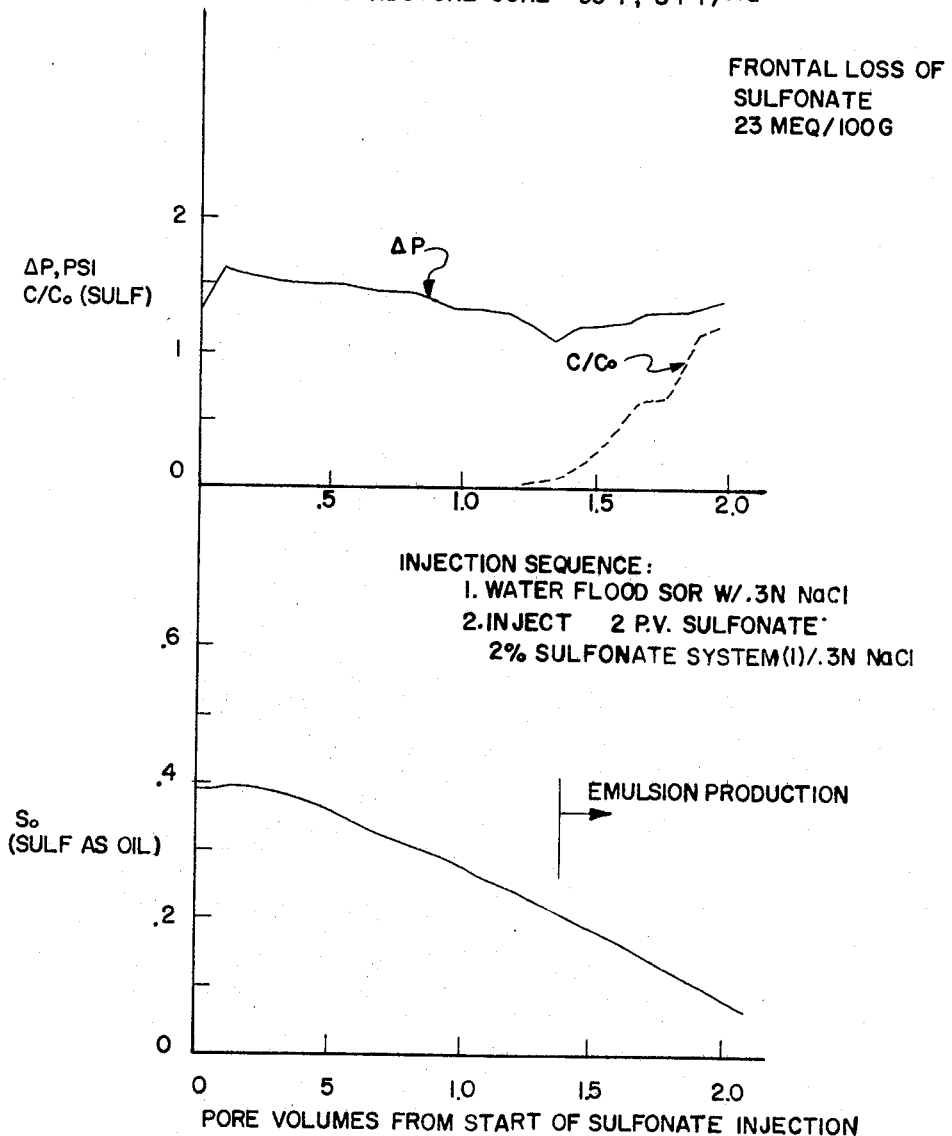

The oil desaturation data of FIGURES 7 and 8 suggest that the tripolyphosphate provides oil recovery efficiency enhancement. The higher rate of oil desaturation and the lower final oil saturation (after 2 pore volumes) appear to be the result of the increased ionic strength provided by the tripolyphosphate additive. The total ionic strength of the .9 percent NaCl plus .5 percent Na$_5$P$_3$O$_{10}$ system is about equivalent to that of a .36 N NaCl system. FIGURE 9 illustrates a 2 percent sulfonate—.30 N NaCl oil recovery experiment. These data show that the oil recovery efficiency of a .9 percent NaCl—.5 percent Na$_5$P$_3$O$_{10}$ system is approximately equivalent to that of a .3 N NaCl system.

Comparison of the pressure data on FIGURES 7 and 9 illustrates the normal reduction of emulsion and sulfonate mobilities at increased NaCl concentration. Similar data on FIGURE 8 indicates that an equivalent ionic strength increase using Na$_3$P$_5$O$_{10}$ does not reduce emulsion and sulfonate mobilities.

The sulfonate production profiles (C/Co) on FIGURES 7 and 9 illustrate the increased frontal lag in the transport of the 2 percent sulfonate at increased NaCl concentrations. It is apparent from FIGURE 8 that the addition of Na$_3$P$_5$O$_{10}$ to the system does not have the same effect on sulfonate frontal lag as an equivalent addition of NaCl. Sulfonate frontal loss calculated from the data on FIGURE 8 was slightly negative (—.02 milliequivalent per 100 grams of rock). This may reflect the limit of accuracy of the technique at low levels of frontal loss.

It is understood that various changes in the details described to explain the invention can be made by persons skilled in the art within the scope of the invention as expressed in the appended cases.

We claim as our invention:

1. In an oil-producing process in which the oil in an oil-containing reservoir formation is displaced by injecting an aqueous drive liquid into the reservoir formation, the improvement which comprises injecting a slug of an aqueous solution that contains a polyphosphate and a mixture of a water soluble surfactant in a concentration that exceeds the critical concentration for micelle formation and enough amphiphilic polar organic material of low water solubility to swell the micelles of said water soluble surfactant and cause said aqueous solution to be capable of solubilizing a significant proportion of oil, with said aqueous solution being present in at least the frontal portion of said aqueous drive liquid.

2. The process of claim 1 in which a slug of an aqueous fluid containing a viscosity increasing agent is injected into the formation prior to the injection of the aqueous drive liquid so as to reduce the tendency of the aqueous drive liquid to finger through said aqueous solution of surfactant and polyphosphate.

3. The process of claim 1 in which the water soluble surfactant is an anionic surfactant.

4. The process of claim 1 in which the amphiphilic group is selected from the group consisting of carboxylic acid, sulfonic acid and hydroxy group-containing compounds and the corresponding carboxylates, sulfonates and hydroxylate derivatives.

5. The process of claim 1 wherein the polyphosphate is an alkali metal polyphosphate.

6. An improvement in water-flooding operations for recovering oil from subterranean reservoirs involving the injection of a slug of aqueous liquid through at least one injection borehole penetrating said reservoir, forcing said aqueous liquid into said reservoir through said injection borehole, and recovering oil displaced from said reservoir by said aqueous liquid at a location spaced from said injection borehole through a production well, said improvement comprising incorporating in at least the initial portion of said aqueous liquid a composition containing a polyphosphate and a mixture of low molecular weight alkyl aryl sulfonates which are water soluble and high molecular weight alkyl aryl sulfonate which are water insoluble, said low molecular weight alkyl aryl sulfonates being present in at least critical micelle concentration with amphiphilic molecules comprising said high molecular weight alkyl aryl sulfonates penetrating into and swelling the micelles, whereby the interfacial tension between said portion of said aqueous liquid containing said mixture and the residual oil in said reservoir is substantially reduced enabling said portion to displace said oil from said reservoir with greater efficiency.

7. The improvement according to claim 6 wherein both the low molecular weight alkyl aryl sulfonates and the high molecular weight alkyl aryl sulfonates are alkali metal salts of said sulfonates and the polyphosphate is an alkali metal polyphosphate.

8. The improvement according to claim 6 wherein the aqueous liquid containing the low molecular weight alkyl aryl sulfonate and high molecular weight alkyl aryl sulfonate salts and the alkali metal polyphosphate also containing an electrolyte in concentrations from 0.05 to 0.7 molar.

9. The improvement according to claim 6 wherein the low molecular weight alkyl aryl sulfonates have an average molecular weight from 300 to 400 and the high molecular weight alkyl aryl sulfonates have an average moleclular weight from 400 to 600 the polyphosphate is Na tri-polyphosphate and the electrolyte is an alkali metal salt.

10. The improvement according to claim 6 wherein the low molecular weight alkyl aryl sulfonates and the high molecular weight alkyl aryl sulfonates are the sodium salts of petroleum sulfonates, the polyphosphate is Na tri-polyphosphate and the electrolyte is NaCl.

11. The process of claim 10 in which a slug of aqueous solution containing a polyacrylamide thickener is injected into the formation prior to or together with the aqueous solution containing the sulfonate mixture and the Na tri-polyphosphate.

References Cited

UNITED STATES PATENTS

| | | | |
|---|---|---|---|
| 3,254,714 | 6/1966 | Gogarty et al. | |
| 3,258,071 | 6/1966 | Yu Shen et al. | 166—275 |
| 3,275,075 | 9/1966 | Gogarty et al. | 166—274 |
| 3,315,743 | 4/1967 | Abdo et al. | 166—275 X |
| 3,330,344 | 7/1967 | Reisberg | 166—275 X |
| 3,332,486 | 7/1967 | McGhee | 166—274 |
| 3,343,597 | 9/1967 | Gogarty et al. | 166—274 X |
| 3,348,611 | 10/1967 | Reisberg | 166—275 |
| 3,370,649 | 2/1968 | Wogelmuth | 166—274 |
| 3,373,809 | 3/1968 | Cooke | 166—275 X |
| 3,406,754 | 10/1968 | Gogarty | 166—275 X |

STEPHEN J. NOVOSAD, Primary Examiner